United States Patent [19]

Drake et al.

[11] Patent Number: 4,829,324

[45] Date of Patent: May 9, 1989

[54] LARGE ARRAY THERMAL INK JET PRINTHEAD

[75] Inventors: Donald J. Drake, Rochester; William G. Hawkins, Webster, both of N.Y.

[73] Assignee: Xerox Corporation, Stamford, Conn.

[21] Appl. No.: 137,283

[22] Filed: Dec. 23, 1987

[51] Int. Cl.⁴ .............................................. G01D 15/18

[52] U.S. Cl. .................................. 346/140 R; 156/647

[58] Field of Search .................. 346/140, 75; 156/644, 156/647, 657

[56] References Cited

U.S. PATENT DOCUMENTS

| | | | |
|---|---|---|---|
| 4,463,359 | 7/1984 | Ayata et al. | 346/1.1 |
| 4,571,599 | 2/1986 | Rezanka | 346/140 R |
| 4,601,777 | 7/1986 | Hawkins et al. | 156/626 |
| 4,612,554 | 9/1986 | Poleshuk | 346/140 R |
| 4,638,337 | 1/1987 | Torpey et al. | 346/140 R |
| 4,639,748 | 1/1987 | Drake et al. | 346/140 R |
| 4,678,529 | 7/1987 | Drake et al. | 156/234 |

*Primary Examiner*—Joseph W. Hartary
*Attorney, Agent, or Firm*—Robert A. Chittum

[57] ABSTRACT

A large array ink jet printhead is disclosed having two basic parts, one containing an array of heating elements and addressing electrodes on the surface thereof, and the other containing the liquid ink handling system. At least the part containing the ink handling system is silicon and is assembled from generally identical sub-units aligned and bonded side-by-side on the part surface having the heating element array. Each channel plate sub-unit has an etched manifold with means for supplying ink thereto and a plurality of parallel ink channel grooves open on one end and communicating with the manifold at the other. The surfaces of the channel plate sub-units contacting each other are {111} planes formed by anisotropic etching. The channel plate sub-units appear to have a parallelogram shape when viewed from a direction parallel with and confronting the ink channel groove open ends. The heating element array containing part may also be assembled from etched silicon sub-units with their abutting surfaces being {111} planes. In another embodiment, a plurality of channel plate sub-units are anisotropically etched in a silicon wafer and a plurality of heating element sub-units are formed on another silicon wafer. The heating element wafer is also anisotropically etched with elongated slots. The wafers are aligned and bonded together, then diced into complete printhead sub-units which have abutting side surfaces that are {111} planes for accurate side-by-side assembly.

7 Claims, 9 Drawing Sheets

LARGE ARRAY THERMAL INK JET PRINTHEAD

BACKGROUND OF THE INVENTION

1. Field of the Invention

This invention relates to thermal ink jet printing, and more particularly to large array thermal ink jet printheads and fabricating process therefor.

2. Description of the Prior Art

Thermal ink jet printing systems use thermal energy selectively produced by resistors located in capillary filled ink channels near channel terminating nozzles or orifices to vaporize momentarily the ink and form bubbles on demand. Each temporary bubble expels an ink droplet and propels it towards a recording medium. The printing system may be incorporated in either a carriage type printer or a pagewidth type printer. The carriage type printer generally has a relatively small printhead, containing the ink channels and nozzles. The printhead is usually sealingly attached to a disposable ink supply cartridge and the combined printhead and cartridge assembly is reciprocated to print one swath of information at a time on a stationarily held recording medium, such as paper. After the swath is printed, the paper is stepped a distance equal to the height of the printed swath, so that the next printed swath will be contiguous therewith. The procedure is repeated until the entire page is printed. For an example of a cartridge type printer, refer to U.S. Pat. No. 4,571,599 to Rezanka. In contrast, the pagewidth printer has a stationary printhead having a length equal to or greater than the width of the paper. The paper is continually moved past the pagewidth printhead in a direction normal to the printhead length and at a constant speed during the printing process. Refer to U.S. Pat. No. 4,463,359 to Ayata et al for an example of pagewidth printing and especially FIGS. 17 and 20 therein.

U.S. Pat. No. 4,463,359 mentioned above discloses a printhead having one or more ink filled channels which are replenished by capillary action. A meniscus is formed at each nozzle to prevent ink from weeping therefrom. A resistor or heater is located in each channel upstream from the nozzles. Current pulses representative of data signals are applied to the resistors to momentarily vaporize the ink in contact therewith and form a bubble for each current pulse. Ink droplets are expelled from each nozzle by the growth of the bubbles which causes a quantity of ink to bulge from the nozzle and brake off into a droplet at the beginning of the bubble collapse. The current pulses are shaped to prevent the meniscus from breaking up and recording too far into the channels, after each droplet is expelled. Various embodiments of linear arrays of thermal ink jet devices are shown, such as those having staggered linear arrays attached to the top and bottom of a heat sinking substrate for the purpose of obtaining a pagewidth printhead. Such arrangements may also be used for different colored inks to enable multi-colored printing.

U.S. Pat. Re. No. 33.572 to Hawkins et al discloses a thermal ink jet printhead and method of fabrication. In this case, a plurality of printheads may be concurrently fabricated by forming a plurality of sets of heating elements with their individual addressing electrodes on one substrate and etching corresponding sets of channel grooves with a common recess for each set of grooves in a wafer. The wafer and substrate are aligned and bonded together so that each channel has a heating element. The individual printheads are obtained by milling away the unwanted silicon material to expose the addressing electrode terminals and then dicing the substrate to form separate printheads.

U.S. Pat. No. 4,638,337 to Torpey et al discloses an improved printhead of the type disclosed in the patent to Hawkins et al wherein the bubble generating resistors are located in recess to prevent lateral movements of the bubbles through the nozzles and thus preventing sudden release of vaporized ink to the atmosphere.

U.S. Pat. No. 4,639,748 to Drake et al discloses another improvement in the printhead of the type disclosed in the patent to Hawkins et al. In this patent, the common manifold for the ink channels contains an integral filter which prevents contaminates in the ink from reaching the printhead nozzles.

U.S. Pat. No. 4,678,529 to Drake et al discloses a method of bonding the ink jet printhead channel plate and heater plates together by a process which provides the desired uniform thickness of adhesive on the mating surfaces and preventing the flow of adhesive into the fluid passageways.

U.S. Pat. No. 4,612,554 to Poleshuk discloses an ink jet printhead composed of two identical parts, each having a set of parallel V-grooves anisotropically etched therein. The lands between the grooves each contain a heating element and its associated addressing electrodes. The grooved parts permit face-to-face mating, so that they are automatically self-aligned by the intermeshing of the lands containing the heating elements and electrodes of one part with the grooves of the other parts. A pagewidth printhead is produced by offsetting the first two mated parts, so that subsequently added parts abut each other and yet continue to be self-aligned.

A copending and commonly assigned U.S. patent application, Ser. No. 082,417, filed Aug. 6, 1987, entitled "Thermal Ink Jet Printhead and Fabricating Process Therefor" to Drake et al, discloses a thermal ink jet printhead of the type which expels droplets on demand towards a recording medium from nozzles located above and generally parallel with the bubble generating heating elements contained therein. The droplets are propelled from nozzles located in the printhead roof along trajectories that are perpendicular to the heating element surfaces. Such configurations is sometimes referred to as "roofshooter". Each printhead comprises a silicon heater plate and a fluid directing structural member. The heater plate has a linear array of heating elements, associated addressing elements, and an elongated ink fill hole parallel to and adjacent the heating element array. A structural member contains at least one recessed cavity, a plurality of nozzles, and a plurality of parallel walls within the recessed cavity which define individual ink channels for directing ink to the nozzles. The recessed cavity and fill hole are in communication with each other and form the ink reservoir within the printhead. The ink holding capacity of the fill hole is larger than that of the recessed cavity. The fill hole is precisely formed and positioned within the heater plate by anisotropic etching. The structural member may be fabricated either from two layers of photoresist, a two-stage flat nickel electroform, or a single photoresist layer and a single stage flat nickel electroform.

Copending and commonly assigned U.S. patent application Ser. No. 115,271 filed Nov. 2, 1987, entitled "An Improved Ink Jet Printhead" to Hawkins, now U.S.

Pat. No. 4,774,530, discloses the use of an etched thick film insulative layer to provide the flow path between the ink channels and the manifold, and copending and commonly assigned U.S. patent application Ser. No. 126,085, filed Nov. 27, 1987, entitled "Thermal Ink Jet Printhead and Fabrication Method Therefor" to Campanelli et al, no U.S. Pat. No. 4,786,352 discloses the use of an etched thick film insulative layer between mated and bonded substrates. One substrate has a plurality of heating element arrays and addressing electrodes formed on the surface thereof and the other being a silicon wafer having a plurality of etched manifolds, with each manifold having a set of ink channels. The etched thick film layer provides a clearance space above each set of contact pads of the addressing electrodes to enable the removal of the unwanted silicon material of the wafer by dicing without the need for etched recesses therein. The individual printheads are produced subsequently by dicing the substrate having the heating element arrays.

Drop-on-demand thermal ink jet printheads discussed in the above patents are fabricated by using silicon wafers and processing technology to make multiple small heater plates and channel plates. This works extremely well for small printheads. However, for large array or pagewidth printheads, a monolithic array of ink channels cannot be practically fabricated in a single wafer since the maximum commercial wafer size is six inches. Even if ten inch wafers were commercially available, it is not clear that a monolithic channel array would be very feasible. This is because only defective channel out of 2,550 channels would render the entire channel plate useless. This yield problem is aggravated by the fact that the larger the silicon ingot diameter, the more difficult it is to make it defect-free. Also, relatively frew $8\frac{1}{2}$ inch channel plate arrays could be fabricated in a ten inch wafer. Most of the wafer would be thrown away, resulting in very high fabrication costs.

The fabrication approaches for making either large array or pagewidth therml ink jet printheads can be divided into basically two broad categories; namely, monolithi approaches in which one or both of the printhead components (heater substrate and channel plate substrate) are a single large array or pagewidth size, or sub-unit approaches in which smaller sub-units are combined to form the large array or pagewidth print bar. For an example of the sub-unit approach, refer to the abovementioned U.S. Pat. No. 4,612,554 to Poleshuk, and in particular to FIG. 7 thereof. The sub-units approach may give a much higher yield of usable sub-units, if they can be precisely aligned with respect to each other. The assembly of a plurality of sub-units, however, require precise individual registration in both the x-y-z planes as well as the angular registration within these planes. The alignment problems for these separate units presents quite a formidable task, the prior art solution of which makes this type of large array very expensive.

SUMMARY OF THE INVENTION

It is an object of the present invention to provide a large array printhead and fabrication process therefore which will permit cost effective precision assembly of a large array ink jet printhead using the sub-unit approach.

It is another object of this invention to provide a large array printhead comprising a plurality of smaller sub-units, each having abutting edges that are defined by photolithography and single crystal planes so that they are very precise.

In the present invention, several embodiments of a large array thermal ink jet printhead are disclosed. In one embodiment, the substrate containing the heating elements is a monolithic substrate. This substrate may be a semiconductive material, such as silicon, but preferably is an insulative material, such as quartz or glass, because silicon wafers having the desired diameter are not commercially available. A pagewidth or large array of heating elements, together with associated addressing electrodes, are formed on one surface thereof. The heating elements are adjacent one of its longer edges and a predetermined distance therefrom. The addressing electrodes permit selective application of current pulses to the heating elements. The electrodes have terminals or contact pads located adjacent the opposite elongated edge having the heating elements. A relatively thick insulative photolithographically patternable layer such as, for example, Riston ® or Vacrel ®, sold by the DuPont Company, is placed over the heating elements and the electrodes. Vias are formed therein to expose the individual heating elements and the contact pads. Formed concurrently in the thick insulative layer is one elongated pagewidth opening or a linear series of elongated openings that are parallel to and spaced a predetermined distance from the heating elements. These openings produce recesses which provide ink flow paths between the channels and the combination ink fill opening and reservoir in each of a series of channel plate sub-units assembled into a single pagewidth or shorter large array channel plate, after the pagewidth or large array channel plates and heater plates are mated. The abutting edges of individual channel plate sub-units have wells parallel to each other and surfaces which follow the {111} planes of a silicon wafer from which they are produced. These walls were formed by patterning and anisotropically etching elongated through holes from opposite sides of the wafer. A plurality of channel grooves and reservoir/fill holes are concurrently formed with one of the elongated holes. To increase the alignment accuracy of the etched grooves and through holes, the first elongated through hole etched is used for subsequent mask alignment, thus removing the angular pattern misalignment relative to the {111} crystal planes. When thick film layers are used intermediate the channel plate and heater plates, clearance shots are formed therein to prevent interference with the precision abutting of adjacent heater plate sub-units during assembly of the heater plates.

In another embodiment, a plurality of sub-units with orientation dependent etched planar edges for butting are produced in both a channel plate wafer and in a heater plate wafer. The channel plate wafer is aligned and bonded to the heater plate wafer, thus simultaneously aligning all the channel plate sub-units with the heater plate sub-units. The etched planar butting edge of each channel plate sub-unit is coplanar with the etched planar butting edge of each heater plate sub-unit. These aligned and bonded wafers are diced to produce a multitude of complete printhead sub-units, capable of being butted together on their etched planar edges to form a pagewidth array.

The foregoing features and other objects will become apparent from a reading of the following specification in connection with the drawings, wherein like parts have the same index numerals.

DESCRIPTION OF THE PREFERRED EMBODIMENT

Figure 1:
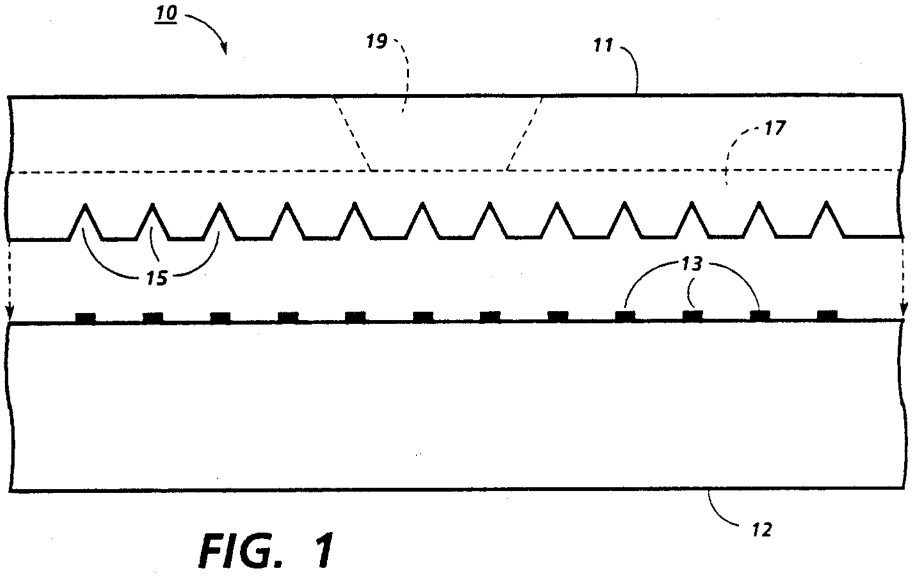
FIG. 1 (Prior Art)
FIG. 1 is an enlarged, schematic front view of a prior art monolithographic thermal ink jet printhead comprising a channel plate and heater plate which are separated for clarity of assembly.
Figure 2:
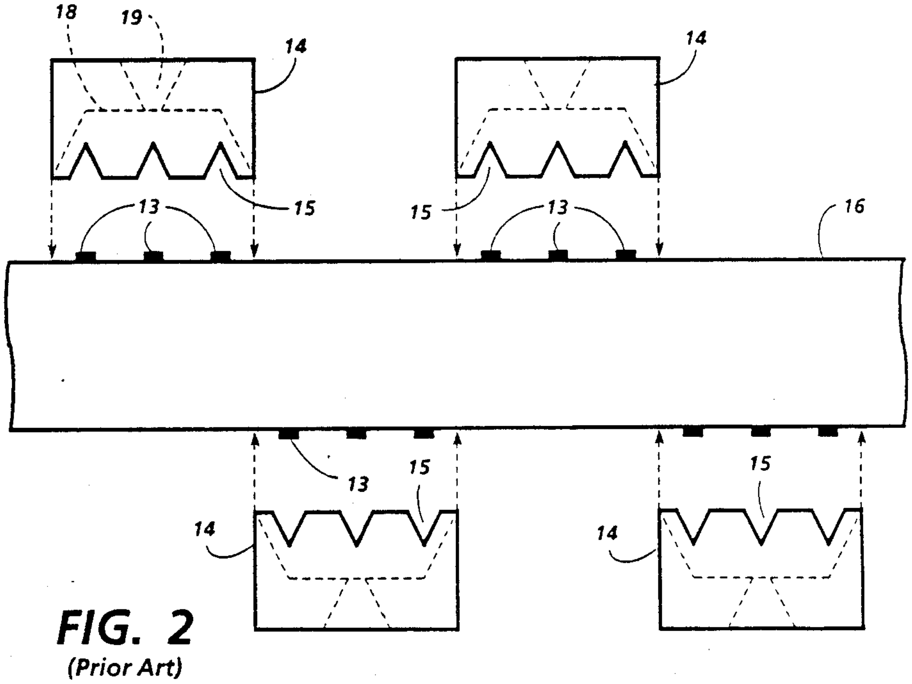
FIG. 2 (Prior Art)
FIG. 2 is an enlarged, schematic front view of a prior art thermal ink jet printhead comprising a monolithographic heater plate having offset arrays of heating elements and addressing electrodes on opposite sides thereof and a plurality of channel plates associated with each array of heating elements.

The fabrication approaches for making large array thermal ink jet printheads fall generally into two broad categories, a monolithic approach in which one or both of the printhead components (heating element substrate and channel plate substrate) are of either a single pagewidth or large array size, or an assembly of sub-units wherein each sub-unit is an individual printhead which are combined to form a pagewidth printhead. FIGS. 1 and 2 show examples of the prior art monolithic approach and U.S. Pat. No. 4,612,554 discloses an example of a sub-unit approach.

In FIG. 1, a partially shown enlarged schematic front view of a prior art monolithic thermal ink jet printhead 10 is shown with the channel substrate separated from the heating element substrate 12 to better emphasize that the printhead is composed of only two parts, both of which are pagewidth in length. The heating element plate 12 contains an array of heating elements 13 spaced across the full pagewidth length and having a spacing of about 300 per inch. The addressing electrodes and common return have been omitted for clarity of this prior art concept. The channel plate 11 has an anisotropically etched channel 15 for each heating element. These channels 15 are parallel to each other and are oriented in a direction normal to the surface of the drawing. Common manifold 17 and fill hole 19 are shown in dashed line.

The prior art pagewidth printhead shown in FIG. 2 has a monolithic pagewidth heating element 16 with staggered arrays of heating elements 13 on opposite surfaces thereof. Channel plate sub-units 14 each have anisotropically etched parallel ink channels 15, with the same orientation as in FIG. 1, a manifold 18, and fill hole 19, the latter two shown in dashed line. The channel plate sub-units are aligned and bonded to the heating element plate, so that each channel 15 has a heating element therein a predetermined distance upstream from the channel open end which serves as a droplet emitting nozzle.

Figure 3:
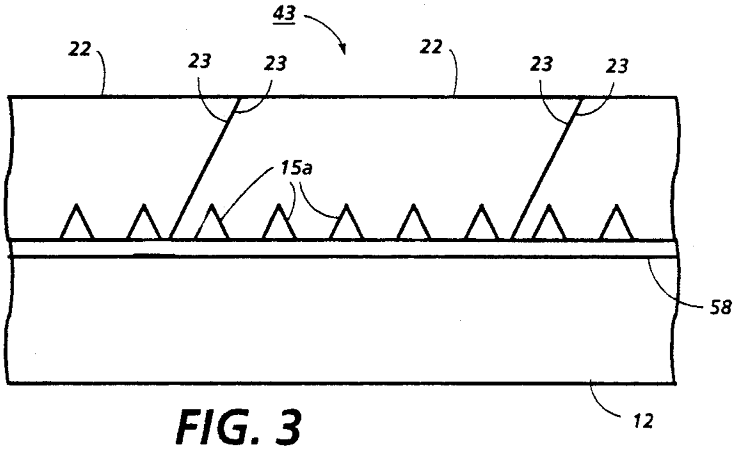
FIG. 3 is an enlarged, partially shown front view of the pagewidth printhead of the present invention.
Figure 4:
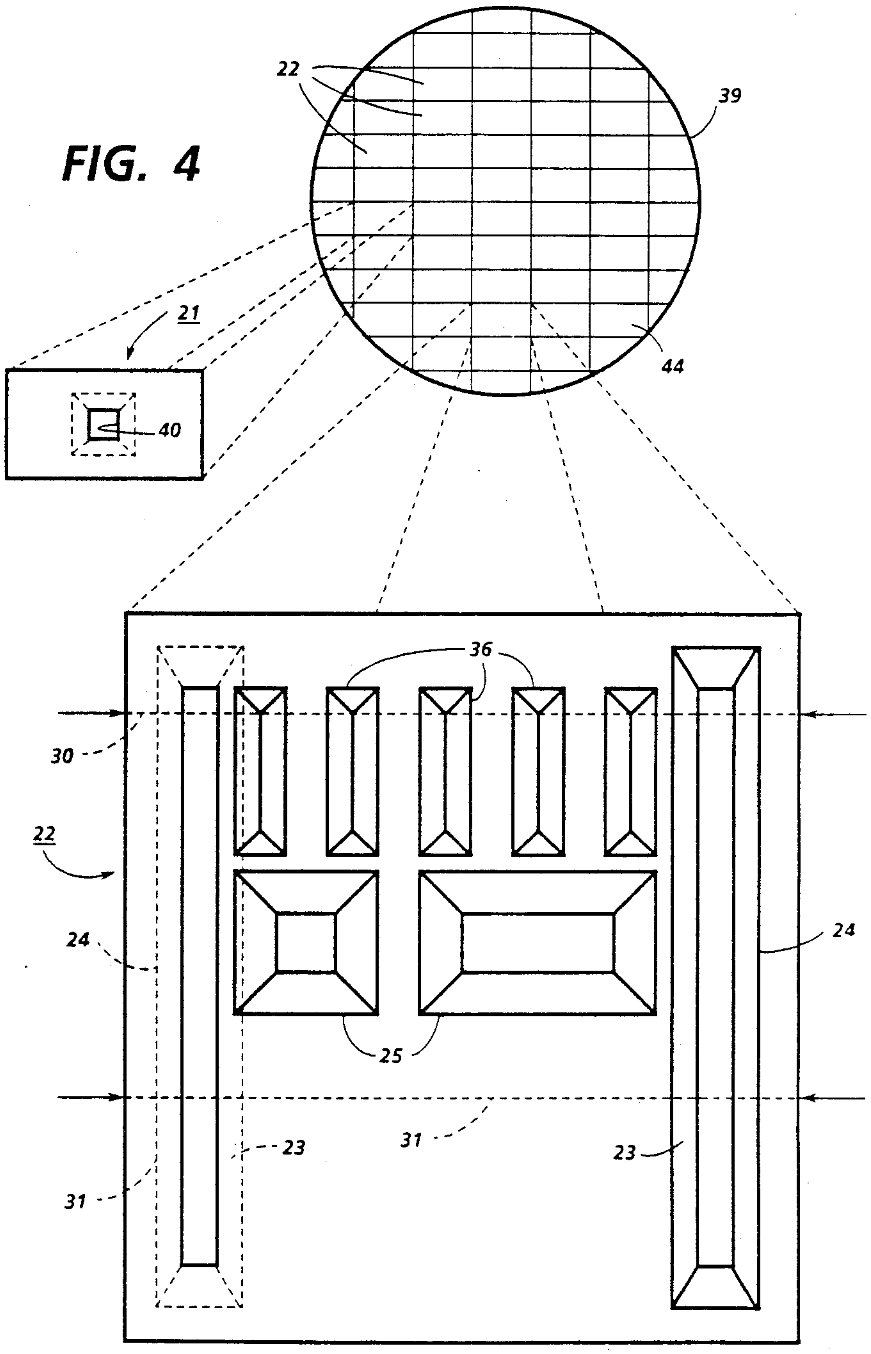
FIG. 4 is a schematic plan view of a wafer having a plurality of etched channel plates of the present invention, with one channel plate and one alignment opening being shown enlarged.

An enlarged schematic front view of a pagewidth printhead 43 of the present invention is shown FIG. 3. The ink droplet emitting nozzles 15*a* are the open ends of anisotropically etched ink channels 15 and are shown coplanar with the surface of the drawing page. The large array or pagewidth printhead comprises one monolithic heating element substrate 12 having a large array of heating elements and addressing electrodes (not shown) thereon, and a plurality of channel plate sub-units 22 with very accurate sloping sides 23 which permit a high precision assembly in an end-to-end abutting relationship. In FIG. 4, a two side polished, (100) silicon wafer 39 is used to produce the plurality of channel plate sub-units 22 for the large array or pagewidth printhead. After the wafer is chemically cleaned, a silicon nitride layer (not shown) is deposited on both sides. Using conventional photolithography, vias for an elongated slot 24 for each sub-unit 22 and at least two vias for alignment openings 40 at predetermined locations are printed on one side of the wafer 42, opposite the side shown in FIG. 4. The silicon nitride is plasma etched off of the patterned vias representing the elongated slots and alignment openings. A potassium hydroxide (KOH) anisotropic etch is used to etch the elongated slots and alignment openings. In this case, the {111} planes of the (100) wafer make an angle of 54.7° with the surface of the wafer. These vias are sized so that they are entirely etched through the 20 mil thick wafer.

Figure 5:
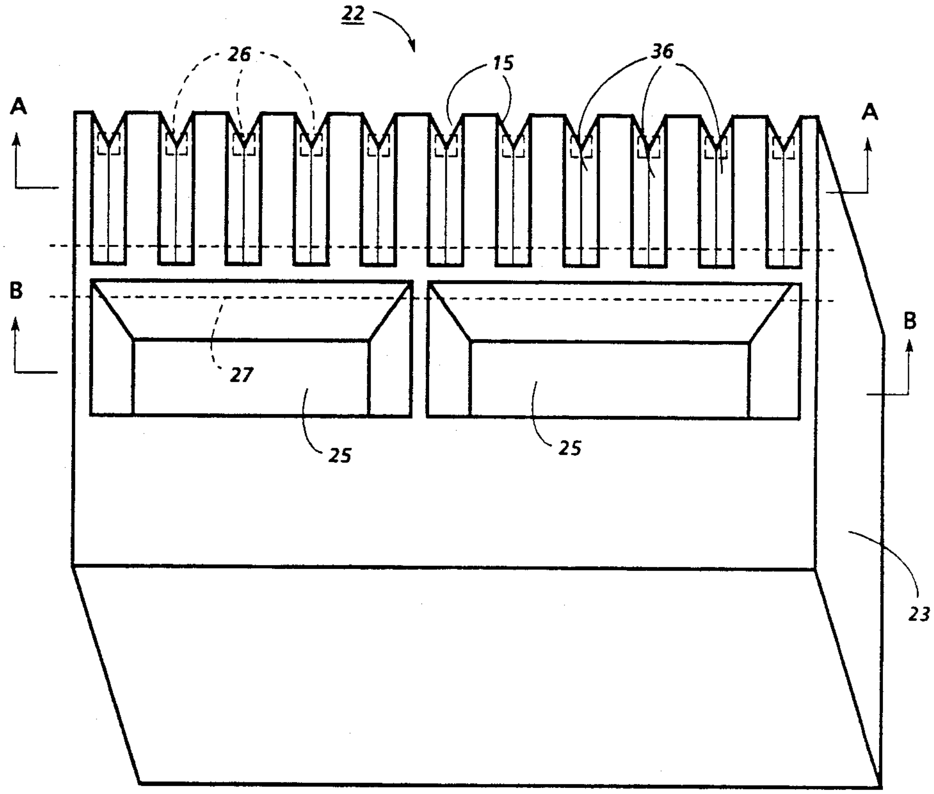
FIG. 5 is an enlarged isometric view of the channel plate shown in FIG. 4 after dicing.
Figure 6:
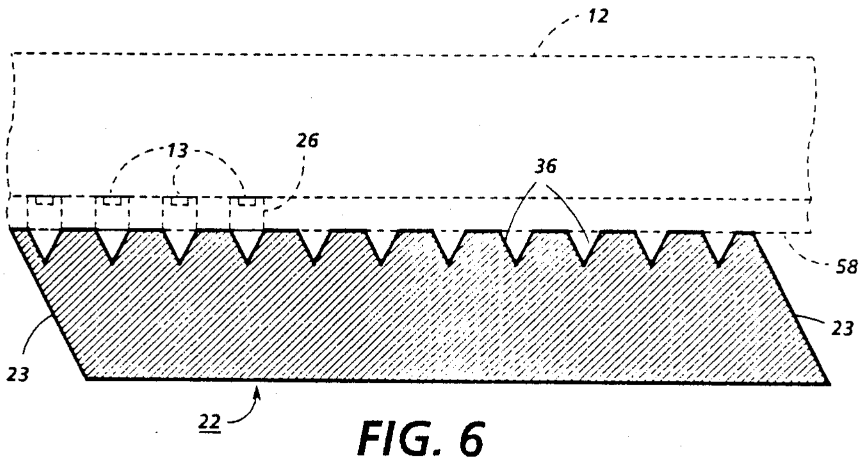
FIG. 6 is a cross sectional view of the channel plate shown in FIG. 5, as viewed along view line A—A.
Figure 7:
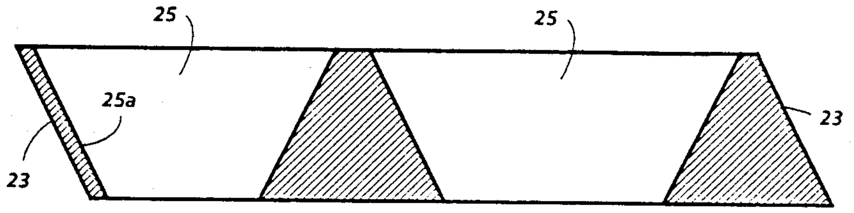
FIG. 7 is a cross sectional view of the channel plate of FIG. 5 as seen along view line B—B.

Next, the opposite side 44 of wafer 39 is photolithographically patterned, using either the previously etched alignment holes or the slot 24 as a reference to form the channel grooves 36, one or more fill holes 25, and a second elongated slot 24. This fabricating process requires that parallel milling or dicing cuts be made which are perpendicular to the channel grooves 36. First, at the end of the channel grooves 36 opposite the ends adjacent the fill hole, as indicated by dashed line 30. Another one is made on the opposite side of the fill holes, as indicated by dashed line 31, in order to obtain a channel plate sub-unit with parallel sides 23 produced by the anisotropic etching. After the dicing operation, the finished channel plate sub-unit is shown in a schematic isometric view in FIG. 5. For reference, the pits 26 in the thick film insulative layer 58 above each heating element and the elongated groove 27 which permits ink to flow from the fill holes 25 to the ink channels 36 are shown in dashed line, since they are not part of the channel plate 22. FIG. 6 is a cross sectional view of FIG. 5 as viewed along view line A—A. This view shows the channels 36 in channel plate 22 assembled with a portion of the heating element substrate 12 shown in dashed line including the heating elements 13, thick film insulative layer 58, etched pits 26 therein above the heating elements 13, all also shown in dashed line. FIG. 7 is a cross sectional view of FIG. 5, as viewed along view line B—B, showing the fill holes 25 and sloping side surfaces 23. Note that on one side of the chanel plate sub-unit, the outside sloping surface 23 is parallel to the internal sidewall 25*a* of the closest fill hole 25. The etched walls 23, 25*a*, define the thickness therebetween, and rely on the survival of this unetched portion having dimensions of less than one mil, or 25 micrometers. This is accomplished even though both the etched through troughs 24 (shown in FIG. 4) and fill holes 25 are etched through the 20 mil thick wafer. Anisotropic etching of silicon in potassium hydroxide is capable of this, assuming good alignment of the etch pattern to the {111} crystal planes. In fact, with perfect alignment, a trough 24 can be etched through the wafer with a pattern undercut of only 0.06 mils. This is based on experimentally observed etch rate ratio of 300:1, which is the etch rate of (100) planes to the etch rate of {111} planes, respectively.

Figure 8:
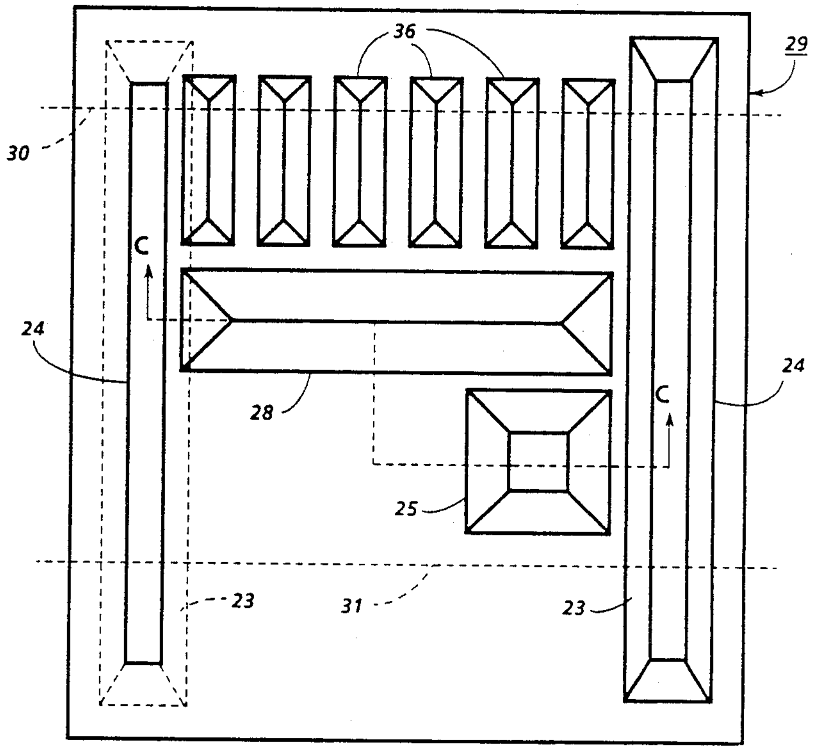
FIG. 8 is a schematic plan view of an alternate embodiment of the enlarged channel plate shown in FIG. 4.
Figure 9:
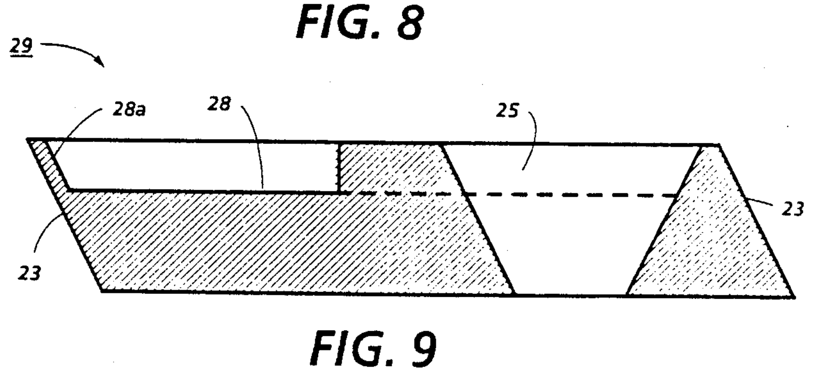
FIG. 9 is a cross sectional view of the channel plate of FIG. 8 as viewed along view line C—C.

FIG. 8 is an alternate embodiment of the channel plate sub-unit 22 shown enlarged in FIG. 4. To prevent such a fragile portion of the channel plate sub-unit, as shown in FIG. 7 between surface 23 and 25*a*, only one fill hole 25 is used in conjunction with a feed trough 28 to provide an ink flow path from the fill hole to the ink channels 36. The feed trough 28 is anisotropically etched perpendicular to the ink chanel grooves 36, and currently etched with the channel grooves 36, fill hole 25, and one of the elongated slots 24. The ink flow path between the fill hole 25 and the ink channels 36 are constructed when the channel plate sub-unit 29 is aligned and bonded to the monolithic, pagewidth heating element substrate containing the patterned thick film insulative layer, not shown. FIG. 9 is a cross sectional view of FIG. 8 as viewed along view line C—C. Thus, the sloping side walls 23 produce a much less fragile channel plate sub-unit 29 because the feed through end wall 28*a* has a much smaller surface area than in the previous embodiment.

Figure 10:
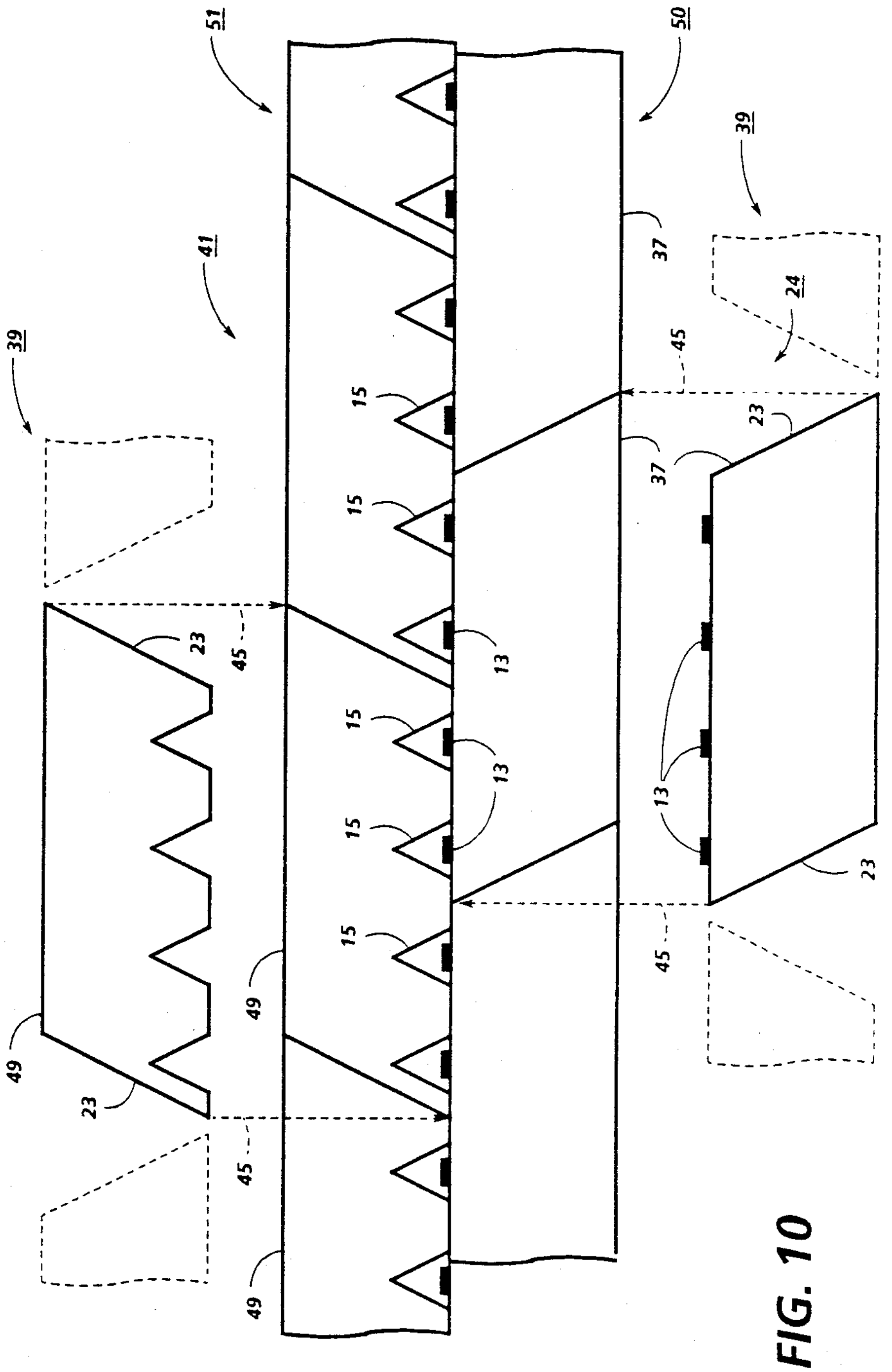
FIG. 10 is an enlarged, partially shown front view of an alternate embodiment of the pagewidth printhead shown in FIG. 3.

In FIG. 10, another embodiment of the large array printhead 41 is shown wherein both the large array channel plate 51 and the large array heating substrate 50 are assembled from sub-units 49 and 37, respectively. The channel plate sub-units 49 are similar to that shown in FIG. 8 with the added process step of opening the closed end of the channel grooves with the ink feed trough 28 and opening the feed trough to the fill hole 25 by means such as dicing, while the sub-units are still in the etched wafer state. The heating element sub-units 37 are fabricated from a silicon wafer 39 and in a similar manner discussed above with respect to the fabrication of the channel plate sub-units. Between each heating element sub-unit 37 in silicon wafer 39, an elongated anisotropically etched slot or groove 24 is formed with the grooves being parallel to each other and etched alternately from opposite sides. Each heating element sub-unit 37 appears as a parallelogram shape when viewed from the front or back edge. A plurality of sets of bubble generating heating elements 13 and their addressing electrodes (not shown) are patterned on one surface of the wafer 39 prior to the etching of the grooves 24. Before the individual heating sub-units 37 are produced by dicing of the wafer, a two micron thick phosphorous doped CVD silicon dioxide film (not shown) is deposited over the entire wafer surface including the plurality of sets of heating elements and addressing electrodes and the elongated slots 24. The passivation layer is etched off of the terminal ends of the addressing electrodes for wire bonding later. FIG. 10 shows a partial cross sectional view of one silicon wafer 39 processed to produce a plurality of channel plate sub-units 49 and another partial cross sectional view of a silicon wafer process to produce a plurality of heating element sub-units 37. One channel plate sub-unit 49 and one heating element sub-unit 37 are shown in solid line and the rest of their respective wafers shown in dashed-line. Arrows 45 depict these sub-units aligned and mated in an offset manner in a fully assembled, partially shown end view of a large array thermal ink jet printhead 41. By staggering the channel and heating element sub-units, the printhead can be assembled while maintaining the spatial and angular alignment between etched sloping surfaces 23 on the respective units. Also, since the channel sub-unit and heating element sub-unit are adhesive bonded, the completed printhead has the structural coherence necessary for a printhead. The abutting edges of these sub-units are formed by anisotropic etching of silicon so that they are precisely defined. In fact, since the component parts of a printhead can all be taken from one heating element wafer and one channel plate wafer, the thickness of the sub-units will not present a problem even though commercial silicon wafers vary from one anotheer in thickness by as much as ±25 micrometers.

Figure 11:
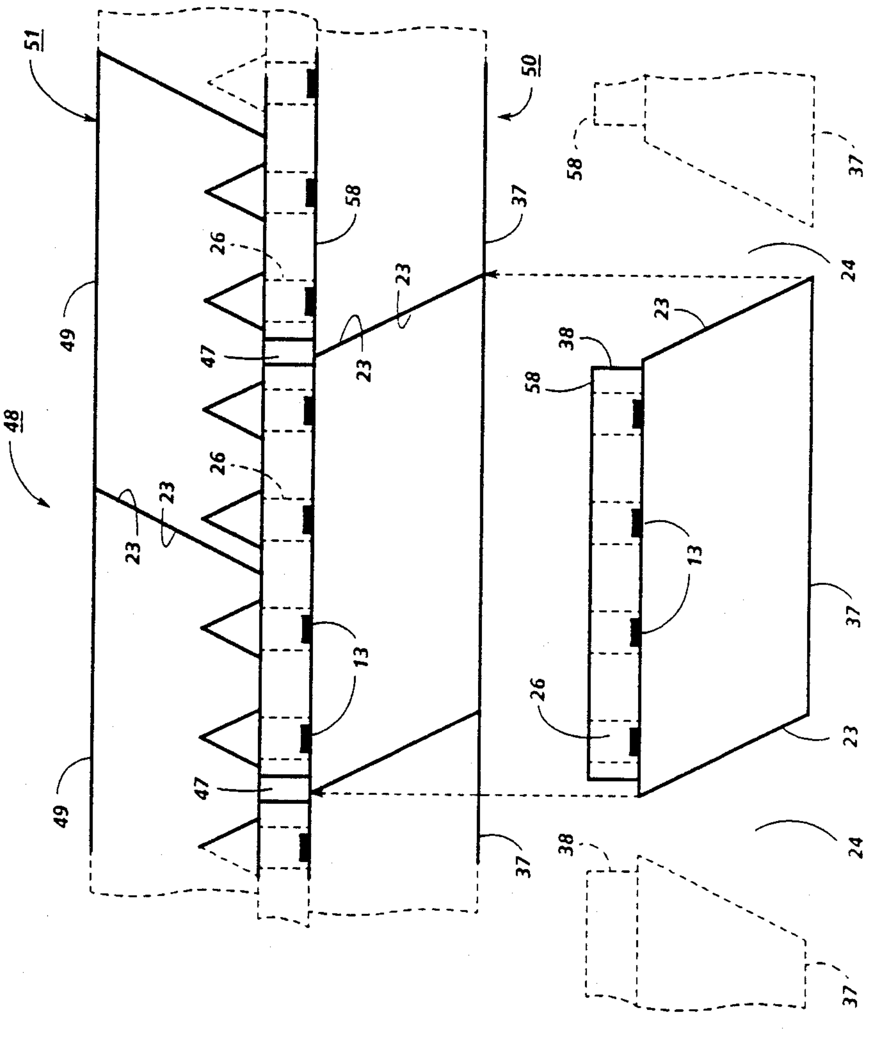
FIG. 11 is an enlarged, partially shown front view of an alternate embodiment of the pagewidth printhead shown in FIG. 10.

FIG. 11 shows an alternate embodiment of the printhead shown in FIG. 10. In this embodiment, a thick film insulative layer 58 has been formed on the heating element wafer and patterned to produce pits 26 over each of the heating elements 13 and elongated slits 38 parallel to the anisotropically etched elongated slots 24, so that when the heating elements sub-units are produced by dicing and assembled to form the printhead 48, gaps 47 will be produced. In this way, the thick film layers do not interfere with the precision abutting of the heating element sub-units 37. In an alternate fabrication process, all of the heating element sub-units could be abutted on some substrate and the thick film insulative layer 58 laminated and processed in one layer over all of the pagewidth heating element plate 50 produced by the assembly of sub-units 37. This would further aid in structural unity of the print bar 48. The channel plate sub-units are identical with the channel plate sub-units shown and described in FIG. 8.

Figure 12:
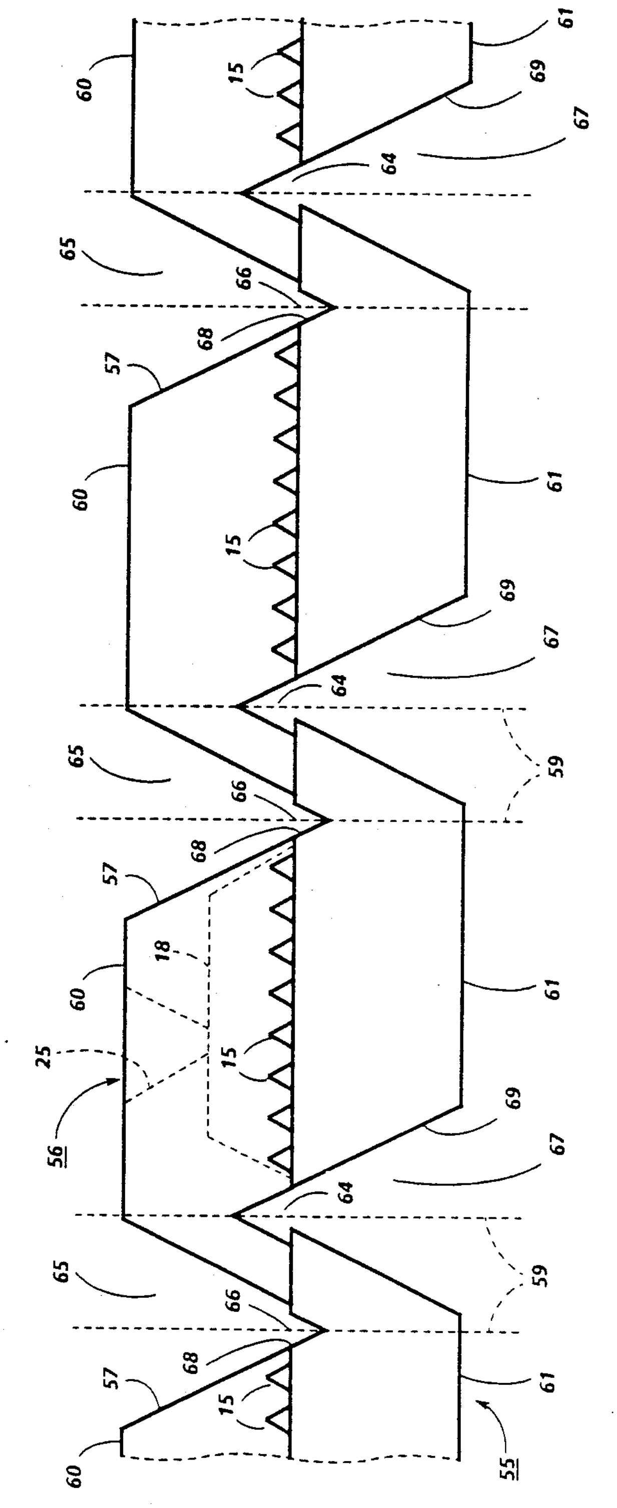
FIG. 12 is a schematic cross sectional view of an etched channel plate wafer that is aligned and bonded to an etched heater plate wafer with dicing paths shown in dashed line to depict a plurality of complete printhead sub-units which are to be subsequently assembled into a pagewidth configuration.
Figure 13:
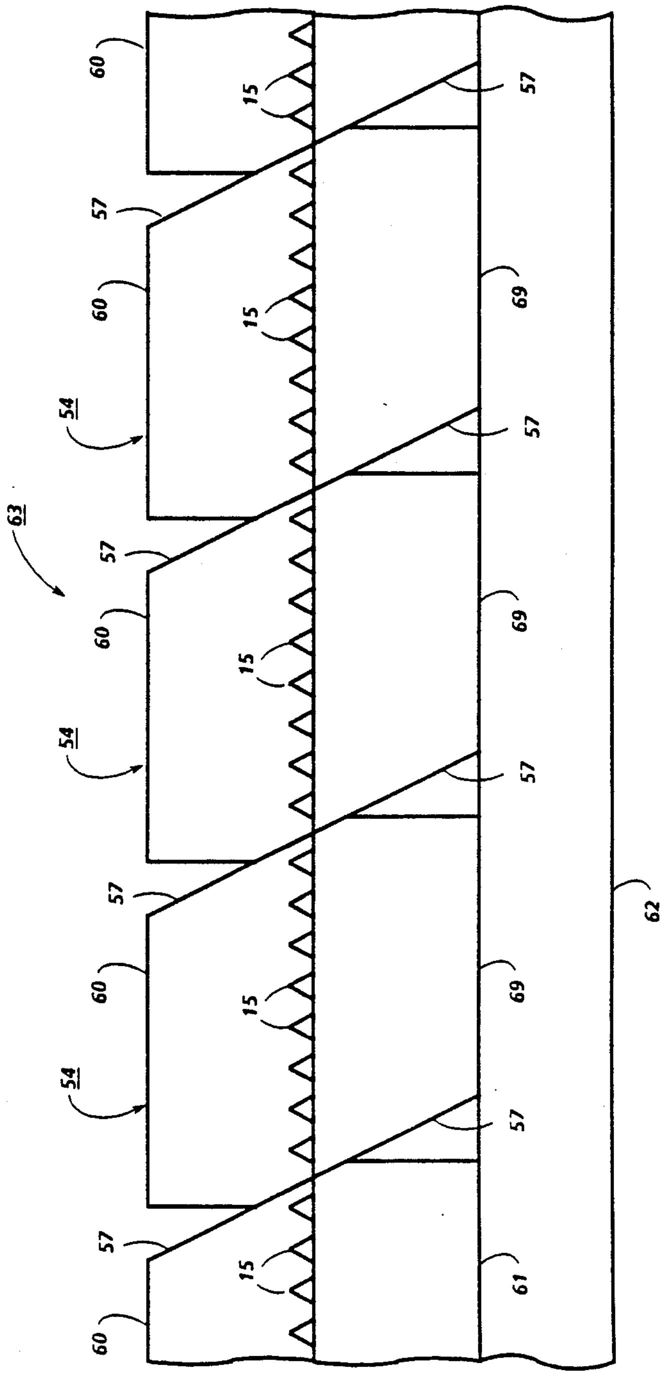
FIG. 13 is an enlarged, partially shown front view of an alternate embodiment of the present invention assembled from the sub-units of FIG. 12.

FIG. 12 is a cross sectional view of another embodiment of the present invention and shows an interim fabrication step wherein an etched silicon channel wafer 56 is aligned and bonded to an etched silicon heater wafer 55. The wafers are aligned and bonded together, so that each etched channel groove 15 of each of the plurality of sets thereon of the channel wafer contain a heating element (not shown). The heating elements are formed in corresponding sets on one surface of the heater wafer. After dicing along dashed lines 59, completely functionable printhead sub-units 54 are produced which, when abutted side-by-side, form a pagewidth printhead 63, shown in FIG. 13. The channel wafer 56 is anisotropically etched to produce the sets of ink channels 15 and associated manifold 18 shown in dashed line. Concurrently etched with the channels 15 is one elongated V-groove 64 for each integral channel plate sub-unit 60. This V-groove is parallel to the set of channel grooves contained therein. A plurality of elongated through slots 65 are anisotropically etched through the surface of the wafer opposite the one having the ink channel grooves 15, one between each channel plate sub-unit 60. The fill hole 25 shown in dashed line may be concurrently with the elongated through slot 65 or optionally the manifold may be etched entirely through the wafer (not shown) to produce the fill hole.

The heating element or heater wafer 55 contains the usual plurality of sets of passivated heating elements and addressing electrodes (not shown) on one surface of the wafer, together with an elongated V-groove 66 in a predetermined location thereon, similar to the V-groove 64 in the channel wafer 56, and adjacent each set of heating elements in each heating element plate sub-unit 61. A plurality of elongated through slots 67 ae etched through the heater wafer from the side opposite the one with the heating elements, one between each set of heating elements. The channel and heater wafers are aligned and bonded together, so that the {111} plane surface 57 of the channel wafer slot 65 is coplanar with the {111} plane surface 68 of heater wafer groove 66. This automatically aligns one of the {111} plane surfaces 69 of each of the heater wafer through slots 67 with a one of the {111} plane surfaces of each of the channel V-grooves 64. Next, the bonded wafers are diced along dashed lines 59 to produce the printhead sub-units 54, shown assembled side-by-side in FIG. 13 to provide a pagewidth printhead 63. Optionally, the printhead sub-units 54 may be assembled on a strengthening substrate 62. One advantage of the approach in FIGS. 12 ad 13 is that the aligning and bonding of the channel plate sub-unit 60 and heating element plate sub-unit 61 is accomplished in wafer form, rather than as individual sub-units. That is, all the channel plate sub-units of one wafer are simultaneously aligned and bonded to all of the heating element plate sub-units contained in another wafer. After dicing the bonded wafers 55, 56 along dashed lines 59, complete printhead sub-units 54 are produced for side-by-side assembly with confronting surfaces of each printhead sub-unit being {111} planes for precise abutting assembly.

Many modifications and variations are apparent from the foregoing description of the invention and all such modifications and variations are intended to be within the scope of the present invention.

We claim:

1. A large array ink jet printhead for use in an ink jet printing device, the printhead being fixedly mounted in the device and capable of simultaneously emitting and propelling a large array line of ink droplets towards a moving recording medium in the device, the printhead comprising:

a first large array substrate having a planar surface containing thereon a pagewidth array of heating elements and addressing electrodes thereon, the electrodes having contact pads for receiving current pulses applied thereto;

a second large array substrate being formed from a plurality of substantially identical silicon sub-units, arranged in side-by-side abutting relationship, the sub-units each having (a) an etched recess in one surface thereof for subsequently holding liquid ink and having an opening for receiving ink into the recess, (b) a plurality of parallel grooves etched in the same sub-unit surface, the grooves being open at one end and closed at the other end, with the closed ends being adjacent the recess, and (c) parallel opposite side surfaces being {111} crystal planes, the sub-unit side surfaces being parallel to the grooves and being produced by anisotropic etching, the sub-units being aligned and bonded one at a time to the plane surface of the first substrate in a manner such that adjacent sub-units having their side surfaces, which are {111} crystal planes, in contact with each other for achievement of high tolerance abutment, and that each recess forms an ink manifold and each groove forms an ink channel having a heating element therein a predetermined distance upstream from the groove open end which serves as a nozzle;

means for providing communication between the grooves and the recess;

means for supplying liquid ink to the manifold opening; and means for selectively applying current pulses representative of digitized data signals to the addressing electrode contact pads.

2. The printhead of claim 1, wherein the means for providing communication between the grooves and the recess comprises a thick film insulative layer sandwiched between the first and second substrates, said layer being patternd to provide through holes therein which are aligned over each heating element so that the heating elements are effectively recessed in a pit, the contact pads are cleared for electrical connection thereto, and one or more elongated slots provide the ink flow path for the ink from the manifold to the channels.

3. The printhead of claim 1, wherein the first substrate is also formed from a side-by-side abutment of a plurality of substantially identical first substrate silicon sub-units having parallel opposite side surfaces which are {111} crystal planes and which are parallel to the side surfaces of the second substrate sub-units; and wherein said first substrate sub-units each have an array of heating elements and associated addressing electrodes with contact pads, so that when the first substrate sub-units are abutted together a pagewidth planar surface is formed with all of the heating elements and addressing electrodes thereon.

4. The printhead of claim 3, wherein the first and second substrate sub-units are all produced on and remain integral with respective anisotropically etched (100) silicon wafers, the wafers containing said respective integral first and second substrate sub-units are aligned and bonded together, sio that all of the first substrate sub-units are simultaneously aligned and bonded to the second substrate sub-units, the aligned and bonded first and second substrate sub-units forming complete printhead sub-units which ae then diced into separate independent printhead sub-units having at least a portion of their side surfaces as {111} planes, and wherein an array of printhead sub-units are placed and aligned side-by-side to form the pagewidth printhead whereby confronting {111} plane side surface portions of each adjacent printhead sub-unit are in contact with each other.

5. The printhead of claim 4, wherein the printhead further comprises a strengthening member having a flat surface upon which the array of printhead sub-units are placed and aligned.

6. The printhead of claim 3, wherein the first substrate sub-units are offset from the second substrate sub-units.

7. The printhead of claim 6, wherein the means for providing communication between the grooves and the recess comprises forming a thick film insulative layer over the planar surface formed by the side-by-side abutment of first substrate sub-units, including the heating elements and addressing electrodes, the layer being etched to expose the heating elements and electrode contact pads, to provide an ink flow path from the manifold to the channels, and to form clearance gaps along the edges adjacent the side surfaces thereof.

* * * * *